United States Patent [19]

Daugherty et al.

[11] 4,203,078
[45] May 13, 1980

[54] APPARATUS FOR AND METHOD OF OPERATING ELECTRON BEAM ATTACHMENT STABILIZED DEVICES FOR PRODUCING CONTROLLED DISCHARGES AND/OR VISIBLE AND UV LASER OUTPUT

[75] Inventors: Jack D. Daugherty, Winchester; Jonah H. Jacob, Cambridge; Joseph A. Mangano, Belmont, all of Mass.

[73] Assignee: Avco Everett Research Laboratory, Inc., Everett, Mass.

[21] Appl. No.: 794,401

[22] Filed: May 6, 1977

[51] Int. Cl.$^2$ ............................................. H01S 3/097
[52] U.S. Cl. ......................... 331/94.5 PE; 331/94.5 G
[58] Field of Search .................... 331/94.5 G, 94.5 PE

[56] References Cited

PUBLICATIONS

Ewing et al., *Physical Review A*, vol. 12, No. 1, Jul. 1975, pp. 129–132.
Bhaumik, *Laser Focus*, Feb. 1976, pp. 54–55.
Mangano et al., *Applied Physics Letters*, vol. 29, No. 7, Oct. 1, 1976, pp. 426–428.
Tisone et al., *Optics Communications*, vol. 15, No. 2, Oct. 1975, pp. 188–189.

*Primary Examiner*—William L. Sikes
*Attorney, Agent, or Firm*—Melvin E. Frederick

[57] ABSTRACT

Apparatus for and method of operating a laser wherein a discharge is produced preferably in a high pressure lasing gaseous mixture comprising at least one suitable first gaseous species capable of providing an excited state which has a finite probability of being ionized and a molecular second gaseous species having a capability for attaching electrons to form negative ions. The gaseous mixture may, for example, comprise argon, neon, helium, xenon, krypton or a metal vapor such as mercury as the first species and, for example, hydrogen iodide, carbon tetrachloride, bromine, iodine or fluorine as the second species. A buffer gas such as, for example, argon, helium or neon may also be used. The discharge is produced by means of an electron beam and an electric field. The discharge resulting from the application of the electric field heats secondary electrons produced by the electron beam to an energy level sufficient to make excited states. Thus, for a mixture comprising argon, krypton and fluorine, for example, the heated secondary electrons pump at least some of the argon and the krypton to the metastable state. The excited argon transfers energy to the krypton to form additional excited krypton which, in turn, reacts with the fluorine to form excited krypton fluoride molecules. The krypton fluoride then dissociates or decays upon the emission of spontaneous or stimulated radiation. At power input levels where the electron density remains constant in time for a constant electric field, efficient discharge pumping of the excited states is provided when the fractional excited state population is kept small. Stable discharge operation is achieved when the lasing mixture contains an amount of the second species gas sufficient to provide an attachment rate n times the equilibrium ionization rate where n is the number of electron excitations which causes ionization of the first species.

29 Claims, 8 Drawing Figures

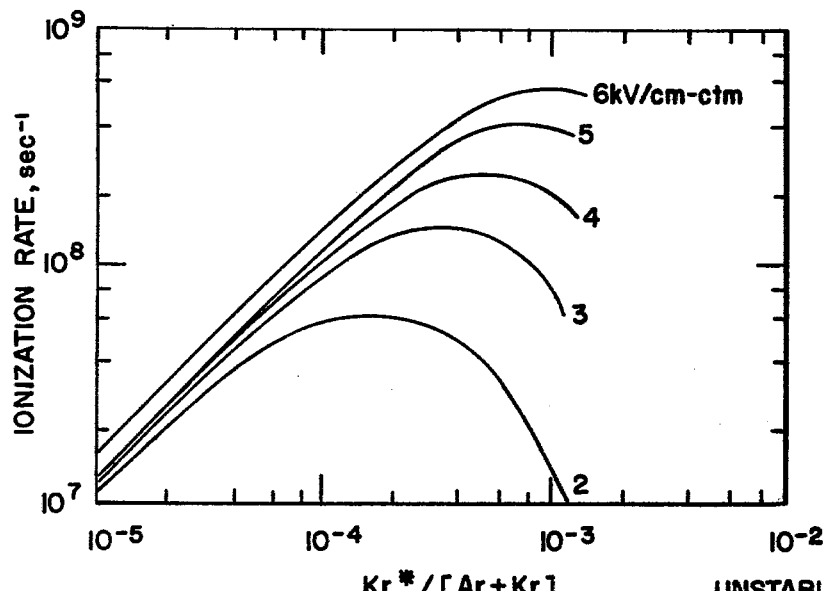
Fig 3
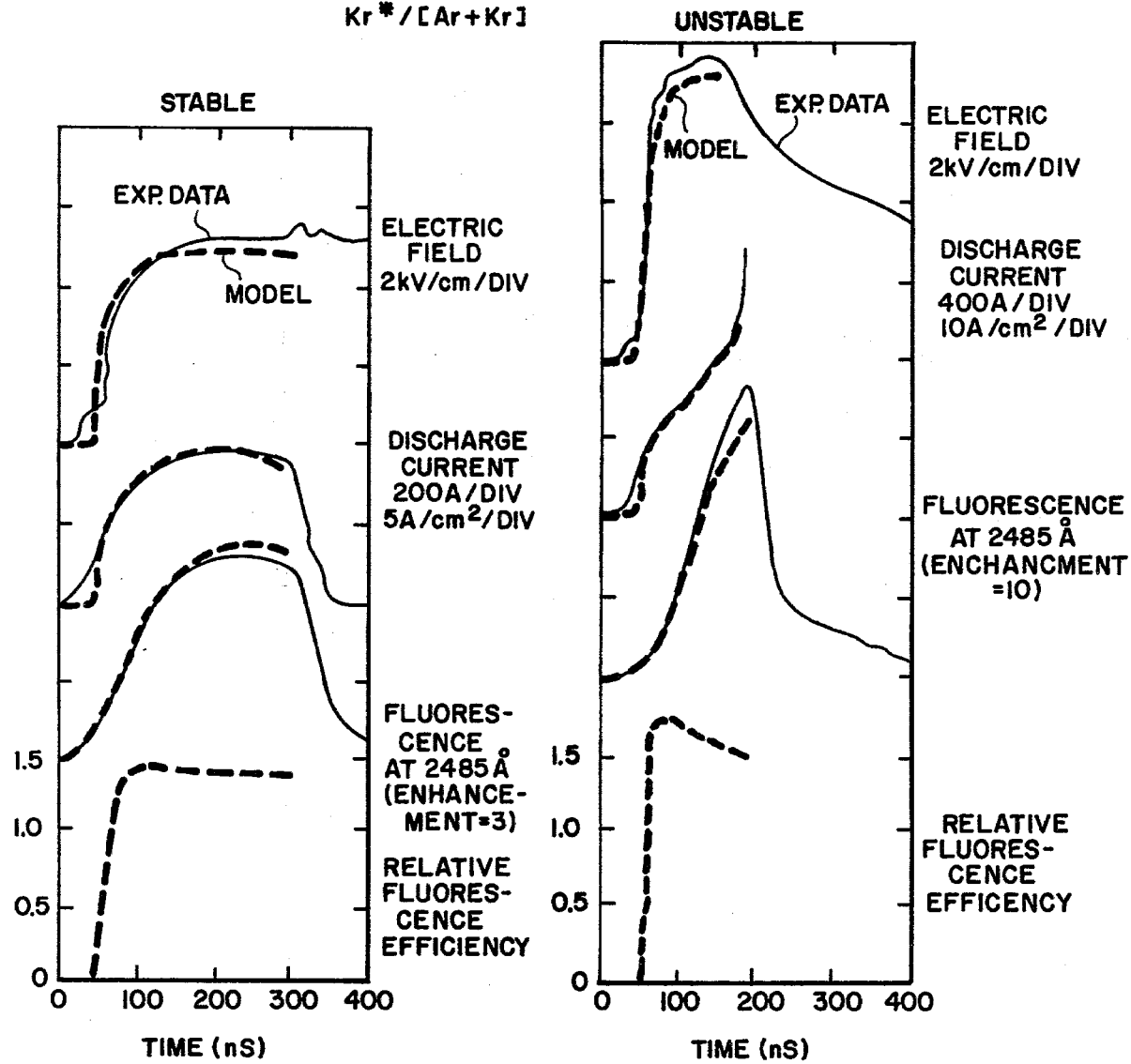
Fig 6
Fig 7

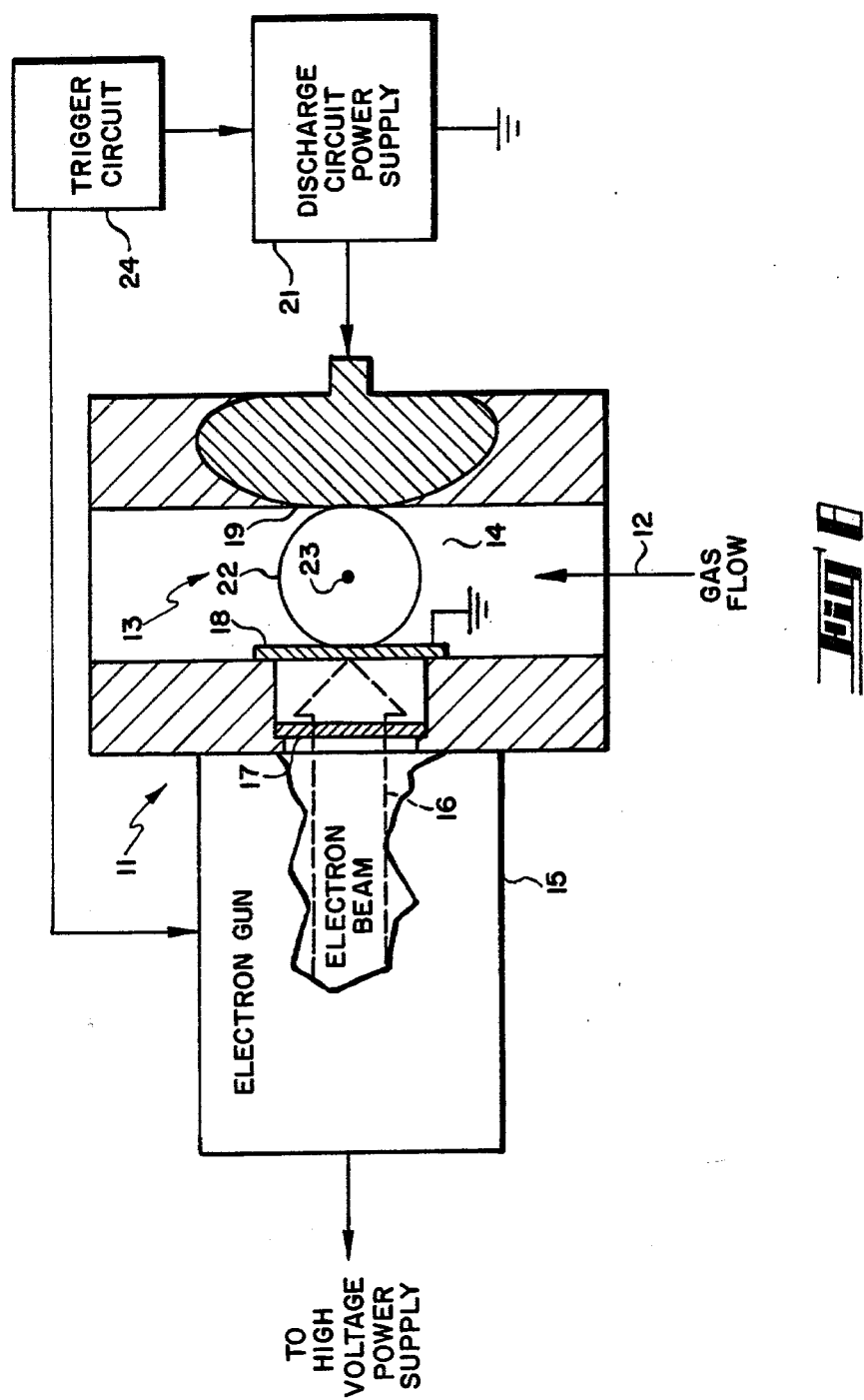

APPARATUS FOR AND METHOD OF OPERATING ELECTRON BEAM ATTACHMENT STABILIZED DEVICES FOR PRODUCING CONTROLLED DISCHARGES AND/OR VISIBLE AND UV LASER OUTPUT

The Government has rights in this invention pursuant to Contract No. N00014-75-C-0062 awarded by the Department of the Navy, Office of Naval Research.

This invention relates to lasers and more particularly to visible and ultraviolet lasers which have an electron attaching species present.

Lasers operating in the visible spectrum are useful in many fields, some of which are optical radar, remote atmospheric and meteorological measurements using Raman backscatter, oceanographic measurements and detection, laser pellet fusion, isotope separation and laser-induced chemistry.

In such lasers, because the photon energy in the visible spectrum is greater than 1 eV, the mean discharge electron energy has to be about 3 eV and greater, i.e., the more energetic (shorter wavelength light) radiation requires a larger energy transition. This compares to a 1/10 eV photon energy in a $CO_2$ laser and a 1 eV discharge electron energy. As a result of these higher electron energies, the ionization rate is many orders of magnitude greater than in $CO_2$ laser discharges and discharge stability (prevention of arcing) is a far more severe problem. So far as is presently known, the only prior art techniques of pumping for visible lasers are well stabilized dischargers such as is used in helium-neon and argon ion lasers, and avalanche (uncontrolled) discharges, such as used in nitrogen lasers. All of the prior art methods are severely limited in size, average power capability and efficiency.

It is an object of the present invention to provide a laser operable in the visible or near ultraviolet portion of the spectrum.

It is another object of the present invention to provide a rare gas halide laser.

It is another object of the present invention to provide apparatus for and a method of providing a stable discharge in a gaseous mixture in which to produce desired lasing action as in the visible and near ultraviolet portion of the spectrum, a large ionization rate is found because electron energies of the order of 3 eV and greater are required.

A still further object of the present invention is to provide a method of and apparatus for producing a stable KrF laser discharge wherein electron attachment is at least equal to twice the ionization rate.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGS. 2-4 are graphic representations of different results of a computer code utilizing FIG. 1, FIG. 2 showing the percentage of energy going into producing krypton and argon metastables, FIG. 3 showing ionization rates, and FIG. 4 showing plots of average electron energy as a function of the fractional metastable population;

FIG. 6 is a graphic representation of experimental data and theoretical predictions when a 0.3 $\mu$F capacitor was charged to 10 kV;

FIG. 7 is a graphic representation of experimental data and theoretical predictions when the capacitor was charged to 16 kV; and FIG. 8 is a diagrammatic representation of laser apparatus for carrying out the invention.

While the preferred embodiment of the present invention will be described in connection with a KrF exciplex laser wherein the lasing medium is a mixture of argon, krypton and fluorine, it is to be understood that other rare gas/halogen and rare gas/oxygen mixtures are included within the scope of the invention as the lasing medium wherein excited state ionization and attachment are the dominant electron production and loss mechanisms respectively, the attachment rate resulting from a loss of electrons by attachment to a constituent gas being at least twice the equilibrium ionization rate. Typical rare gases are xenon, argon and krypton and typical halides are fluorine, bromine and iodine. Lasers in accordance with the present invention can operate at subatmospheric pressures as well as at pressures in excess of one atmosphere.

The physics of rare gas/halogen discharges is dominated by the excited species when the fractional population of the rare gas metastables exceeds about $10^{-9}$. The dominant ionization mechanism in KrF laser discharges ($Kr^*/Kr+Ar \approx 10^{-5}$) is ionization of argon and krypton metastables, i.e., two-step ionization. The ionization rate is proportional to the power density deposited by the discharge and thus is not just a function of the discharge electric field. Another important process in such discharges is the excitation of mestastables to higher lying levels. This process strongly influences the secondary electron energy distribution function and also the efficiency of producing the rare gas metastables in the discharge.

Two distinct discharge operating regimes are possible. The first is a stable regime in which the rapid metastable ionization is balanced by $F_2$ electron attachment so that the electron density reaches a stable equilibrium. The second and heretofore less desirable regime is an unstable regime seen at higher discharge power inputs where the electron density increases faster than exponentially for a constant electric field.

For purpose of the present invention, the discharge heats the secondary electrons produced by the electron beam until they have sufficient energy to make argon and krypton metastables. The krypton metastables are formed by direct electron impact and/or by collisional transfer from argon metastables while the argon metastables are formed by direct electron impact. KrF* is created by the following reactions:

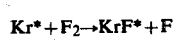

or $$Ar^* + F_2 \rightarrow ArF^* + F$$

followed by $$ArF^* + Kr \rightarrow KrF^* + Ar$$

Since KrF is very weakly bound or unbound in the ground state, KrF* decays into krypton and fluorine after emitting a photon.

Figure 1:
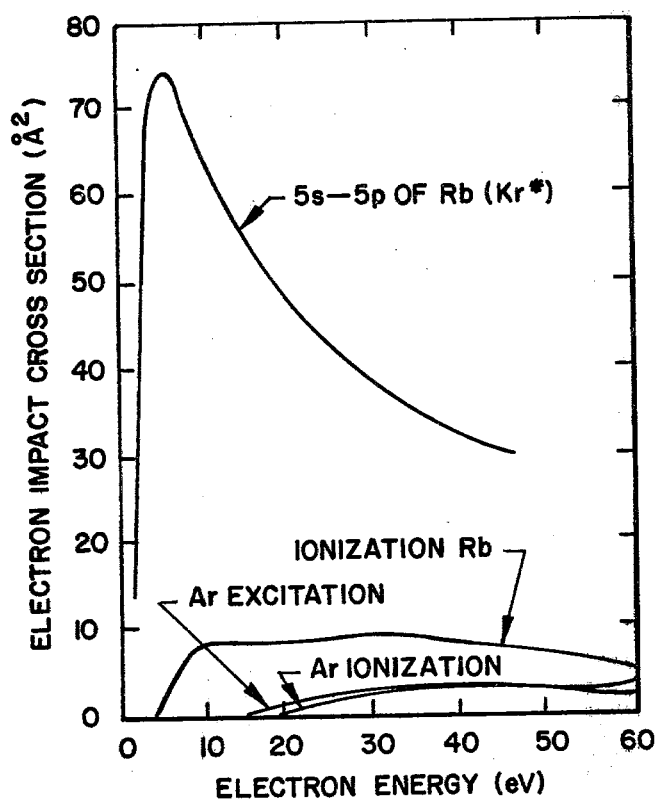
FIG. 1 is a graphic representation of predicted electron impact cross sections for krypton metastables and argon metastables, together with the ionization cross section of rubidium, wherein krypton metastables are treated as rubidium and argon metastables are treated as potassium.

The discharge physics is strongly affected by electron impact excitation and ionization of the rare gas metastables. To model these effects, the krypton metastables may be treated as rubidium and the argon metastables treated as potassium. This assumption is supported by the fact that it has been used successfully in predicting the emission spectra of the excited rare gas monohalides and is further justified physically by the atomic similarity between rare gas metastables and the alkalis. Some of the electron impact cross sections thus obtained are shown in FIG. 1. The cross section for excitation from the 5s configuration to the 5p configuration in Rb (Kr*) has a peak value of 75 Å at 8 eV. Also shown are the ionization cross section of Rb and the excitation and ionization cross sections of Ar. From FIG. 1 it is clear that the peak value of the metastable excitation cross section is 30 times the peak value of the argon excitation cross section. More important, however, is that most of the electrons can excite the 5s to 5p transitions which have a threshhold of 1.6 eV, whereas only the high energy tail of the electron energy distribution (those electrons having at least 10 eV of energy) can produce metastables from the ground state.

Figure 2:
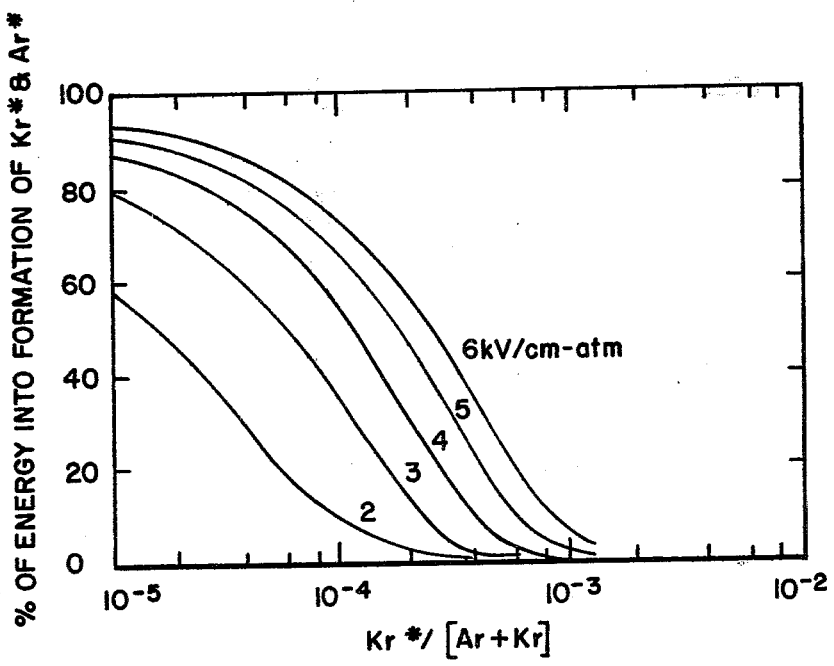
Figure 4:
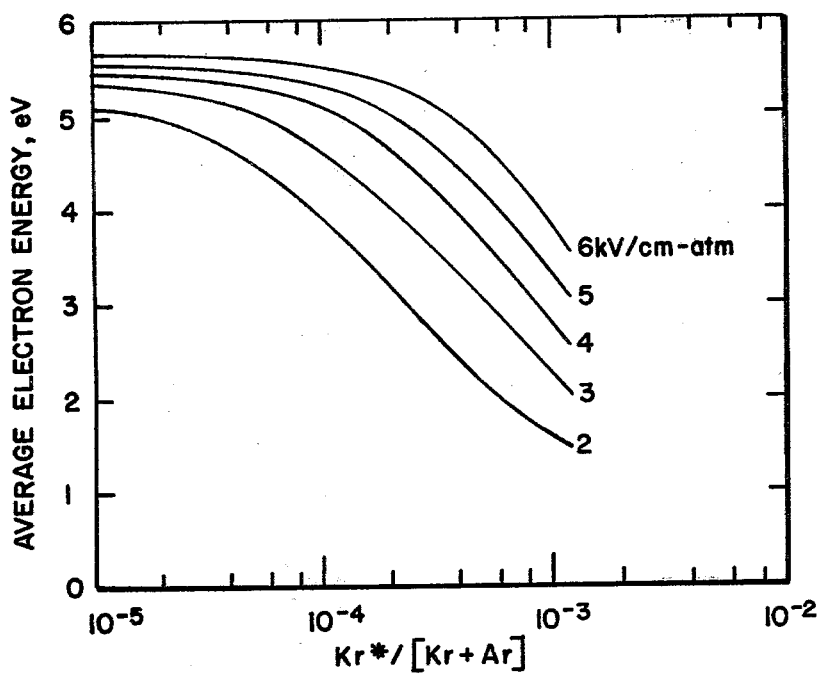

The above-noted cross sections have been put into a computer code which solved the Boltzmann electron transport equation. This Boltzmann code takes the cross section data and the electric field and calculates self-consistently the electron energy distribution and the partitioning of discharge energy amongst the various excited states and ionization. The predictions of the code are shown in FIGS. 2, 3, and 4. FIG. 2 shows the percentage of energy that goes into producing Kr* as a function of the fractional metastable population Kr*/(Kr+Ar) for electric fields of 2–6 kV cm atm. It is apparent from FIG. 2 that the efficiency of producing the metastables is a strong function of the Kr* population. For example, the efficiency of forming Kr* is almost 60% when the fractional population is $10^{-5}$ and the electric field is 2 kV/cm atm. This efficiency decreases to less than 10% when the fractional population is increased to $10^{-4}$. This decrease in efficiency can be made up by increasing the electric field. However, the ionization rate (see FIG. 3) increases rapidly and may quickly become so large that it precludes discharge stabilization by $F_2$ electron attachment for cases where the discharge power sufficiently exceeds the E-beam power into the laser medium. FIG. 4 is a plot of the average electron energy as a function of the fractional metastable population. It is to be noticed that the electrons cool as the metastable population increases. The cooling effect is much stronger at smaller electric fields.

Using the rate constants predicted by the Boltzmann code, a self-consistent kinetics code has been developed that follows the temporal evolution of the secondary electrons, positive and negative ions, Ar*, Kr* and KrF*. The kinetics code may be coupled to a simultaneous set of differential equations that describe the electrical circuit. The outputs of this code may include the temporal evolution of the discharge current and voltage and the KrF* fluorescence for a given preionization level, discharge capacitor charge voltage and gas mixture.

Figure 5:
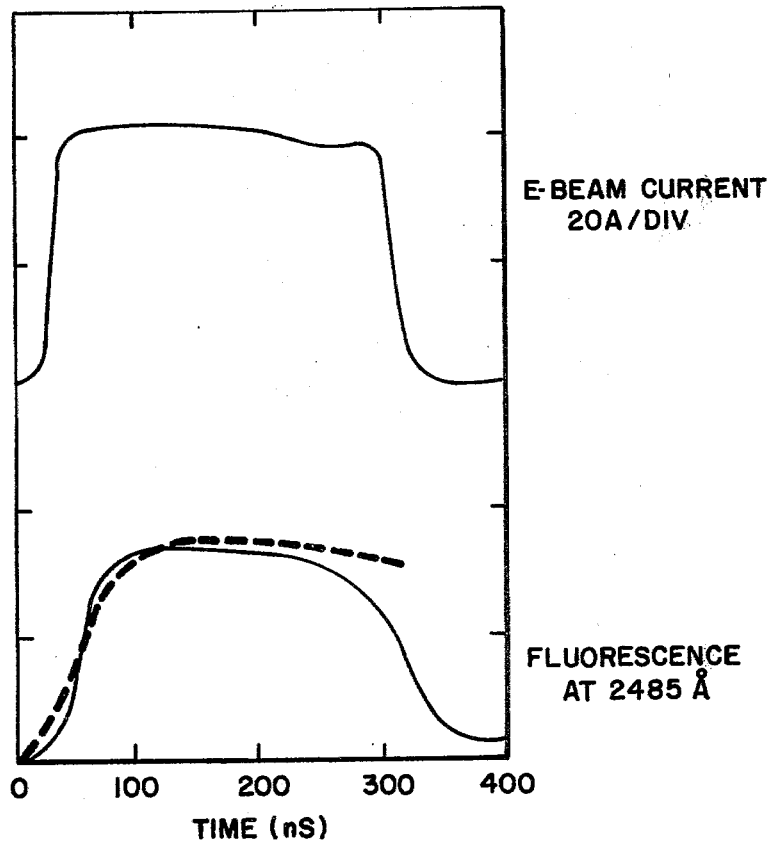
FIG. 5 is a graphic representation of electron beam current in a discharge cavity (upper trace) and comparison of experimentally observed fluorescence with results obtained from the code (lower trace)

The predictions of this discharge model were compared with KrF laser discharge experiments. The top trace in FIG. 5 is the E-beam current in the discharge cavity and the lower trace is the fluorescence as observed by a photomultiplier after the signal passes through a ¼ meter Jarrel Ash monochromator tuned to 2485 Å. The cavity was filled with a 2 atm mix of 93.7% Ar, 6% Kr and 0.3% $F_2$. The dashed trace is the prediction of the code. The amplitude of this predicted trace was adjusted to closely match the measured fluorescence. This amplitude normalization was necessary due to the absence of an absolute calibration on the fluorescence emanating from the discharge. For subsequent comparisons between experiment and theory, no further adjustments were made.

If the KrF* fluorescence amplitude is normalized, the magnitude and efficiency of discharge produced KrF* fluorescence enhancement can be measured. FIG. 6 shows the experimental results and theoretical predictions when a 0.3 $\mu$F capacitor was charged to 10 kV. The top trace is the discharge voltage, the second trace is the discharge current, and the third trace is the KrF* fluorescence. By the end of the pulse, the enhancement in the fluorescence is 3. The metastables are being produced with a maximum efficiency of 1.4 times the efficiency of producing the metastables by a pure E-beam. FIG. 7 shows the results when the capacitor was charged to 16 kV. In this case, the discharge current continually increased until the discharge went through the glow to arc transition which is marked by an abrupt decrease in KrF* fluorescence. It is believed that the initial (almost linear) increase in the discharge current is caused by a volumetric discharge instability. The efficiency for producing metastables rises rapidly to 1.7 times the efficiency of producing metastables in a pure E-beam and them begins to fall despite the fact that the voltage is constant. The KrF* production efficiency decreases because the metastable density increases and the discharge pumping efficiency of Ar* and Kr* falls.

From the above, it will be seen that, in accordance with the present invention, rare gas metastables can be produced with high efficiency (70–80%) as long as the fractional metastable population is kept sufficiently small ($\leq 2$–$3 \times 10^{-5}$). This high metastable production efficiency can lead to KrF* production efficiencies as high as 35% under suitably controlled discharge conditions. It may also be seen that large metastable ionization rates accompany fractional metastable populations of $2$–$3 \times 10^{-5}$. In accordance with the present invention, it has been found that in rare gas/halogen mixtures, this rapid ionization can be balanced by the provision of an attachment rate that is at least twice the ionization rate so that long, stable discharge pulses are possible.

Direction attention now to FIG. 8 which illustrates laser apparatus for carrying out the invention, there is shown in combination, an electrically nonconductive duct 11 for receiving a flowing gaseous lasing medium 12 including an optically resonant cavity 13 having a working region 14, an electron beam gun 15 for generating a substantially uniform broad area electron beam 16 and introducing it through an electron window 17 into the working region 14 to ionize the lasing medium therein, a reticulated discharge cathode electrode 18 adjacent the electron beam window 17, a discharge Rogowski anode 19 opposite the cathode 18 to produce a discharge across the working region and the lasing medium therein when ionized by the electron beam 16 from the electron beam gun 15, and a power supply 21 for applying a discharge voltage across the cathode 18 and anode 19.

For a more thorough discussion of laser apparatus utilizing an electron beam and an electric discharge for producing lasing action, reference is made to U.S. Pat. No. 3,702,973 issued Nov. 14, 1972, which is incorporated herein as if set out at length.

Broadly, in the aforementioned patent, albeit that reference is briefly made to the possibility of using attachment stabilization at Column 16, lines 32–42, the discharge voltage is maintained at a level less than that which would cause significant secondary ionization. While the apparatus for carrying out the invention is similar in most, but not all, respects, to that of the aforementioned patent, the present invention is concerned only with the production of laser action in the visible or ultraviolet range where, if higher electron beam densities are not required, discharge voltages sufficient to produce significant secondary ionization are required. In the absence of a mechanism, such as attachment as suggested in the aforementioned patent, the production of significant secondary ionization results in an uncontrollable discharge or arcing.

The present invention, while utilizing the basic components of the electron beam-sustainer stabilized laser, contemplates the use of a lasing mixture requiring pumping by the electric or sustainer discharge at a level to produce significant secondary ionization. However, the lasing mixture, in addition to containing one rare gas such as krypton, and a second inert rare gas (buffer) such as argon, also contains a third constitutent, such as fluorine, a portion of which not only participates in the production of the stimulated emission, but a further portion is also present in a quantity that the attachment rate of secondary electrons to its atoms is at least twice the equilibrium ionization rate in the lasing mixture.

While the type of electron beam gun 15 is not critical, it has been found that at the electron beam parameters found useful (for example, 2–5 amps/cm$^2$ and 130–150 kV), the cold cathode type electron beam gun is preferable because of its efficiency, rapid turn on/turn off characteristics, simplicity, and ability to deliver high power pulses of nanosecond duration. However, it is to be noted that the present invention is not limited to the use of electron beams. The ionization produced by the described electron beam may also be produced, for example, by photons, nuclear fission, ion beams and the like.

The power supply 21 for the discharge circuit may be of conventional high voltage, low inductance capacitive discharge design and triggered in conventional manner as by a triggered spark gap.

Returning now to FIG. 8, the discharge cathode may be a stainless steel screen 18 disposed over and covering the E-beam window 17. The discharge anode 19, because of the currents and voltages that may be involved, is preferably of the Rogowski type as shown in FIG. 8. Such an anode configuration leads to greatly increased uniformity in the discharge.

The optically resonant cavity is defined by two oppositely disposed mirrors in conventional manner. Only one mirror 22 is shown in FIG. 8, the optical axis 23 being normal to the direction of the electron beam and normal to the direction of gas flow. The output laser beam may be coupled out of the working region by a partially transmissive mirror, or for very high power operation, by a suitable aerodynamic window.

The electron beam gun may typically provide 2 amps/cm$^2$ at 200 kV in the working region at a pressure of about 1–3 atmospheres, the discharge circuit provides about 3 kV/cm atmospheres in a lasing medium comprising about 93.7% argon, 6.0% krypton and 0.3% fluorine. Typical pulse lengths may be 300 nanoseconds to 1 microsecond. However, apparatus in accordance with the invention may operate in the CW mode where failure of the electron beam window can be avoided.

The discharge circuit may typically provide about 3 kV/cm atmosphere for a pulse length of about 250 nanoseconds, the discharge pulse beginning about 40 nanoseconds after the beginning of the electron beam pulse. Trigger circuit means 24 are provided for actuating the electron beam gun and discharge circuit in the desired time relationship. The lasing medium may comprise about 93.7% argon, 6.0% krypton, and 0.3% fluorine at a pressure of about three atmospheres and provide an output laser beam at 2485 Å.

Radiation in accordance with the invention is produced when KrF* emits a photon at 2485 Å and decays into krypton and fluorine. The KrF* is produced first, when excited krypton reacts with fluorine to form excited krypton fluoride (Kr*+F$_2$→KrF*+F), and second, when excited argon reacts with fluorine to produce excited argon fluoride (Ar*+F$_2$→ArF*+F) which then reacts with krypton to produce additional krypton fluoride (ArF*+Kr→KrF*+Ar).

It has been previously pointed out that in a KrF laser, the efficiency of producing the metastables is a strong function of the Kr* population, i.e., at low metastable densities, the efficiency is high and vice versa. As also previously pointed out, one can compensate for a decrease in efficiency by increasing the electric field produced by the discharge circuit. However, when this is done, the ionization rate rapidly becomes so large that it precludes discharge stabilization by attachment for those cases where the discharge power at least substantially exceeds the E--beam power into the lasing medium.

Where xenon or krypton is used, argon is necessary as a buffer gas. Further, for a mixture of xenon and argon, nitrogen trifluoride may be substituted for fluorine. Thus, for operation at four atmospheres, for example, the lasing medium may comprise 99.5% argon, 0.4% xenon, and 0.1% nitrogen trifluoride. It is to be noted that for a lasing gas mixture of only argon and fluorine, for example, a buffer gas is not required.

In accordance with the present invention, where electron beam-electric field pumping is utilized, the power put into the gaseous lasing mixture by the application of the electric field should be sufficient to produce the lasing radiation desired as discussed earlier, and in any event, not less or substantialy less than the power put into the lasing mixture by the electron beam. The ionization rate produced by secondary electrons should not be greater or substantially greater than one-half the attachment rate.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. In laser apparatus having means for producing a substantially spatially uniform discharge in a gaseous lasing medium, said discharge producing means comprising:
   (a) a gaseous lasing medium comprising a first gaseous species capable of being electronically excited and a halogen bearing molecular second gaseous species;
   (b) a cavity for receiving said lasing medium;
   (c) first means for ionizing said lasing medium in said cavity and generating free electrons; and
   (d) second means for applying a voltage across said lasing medium to heat said free electrons to an energy level necessary to produce an excited metastable state in said first species and excite a portion of said first species to the metastable state whereby said excited first species reacts with said second species to form an excited composite comprising said excited first species and said second species, said first and second means providing an equilibrium ionization rate in said lasing medium; said second species being present in an amount to provide an electron attachment rate at least about n times the said equilibrium ionization rate where n is the number of electron excitations which causes ionization of said first gaseous species.

2. In laser apparatus having means for producing a substantially spatially uniform discharge in a gaseous lasing medium, said discharge producing means comprising:
   (a) a gaseous lasing medium comprising a first gas capable of being electronically excited and a second halogen bearing molecular gas;
   (b) a cavity for receiving said lasing medium;
   (c) first means for ionizing said lasing medium in said cavity and generating free electrons; and
   (d) second means for applying a voltage across said lasing medium to heat said free electrons to an energy level necessary to produce an excited metastable state in said first gas and excite a portion of said first gas to the metastable state whereby said excited first gas reacts with said second gas to form an excited composite comprising said first gas and said second gas, said first and second means providing an equilibrium ionization rate in said lasing medium; said second gas being present in an amount to provide an electron attachment rate at least about n times the said equilibrium ionization rate where n is the number of electron excitations which causes ionization of the said first gas.

3. In laser apparatus, the combination comprising:
   (a) a gaseous lasing medium comprising a first rare gas, a second rare gas and a halogen;
   (b) an optically resonant cavity for receiving said lasing medium;
   (c) first means for depositing power in said lasing medium effective to ionize said lasing medium in said cavity and generating free electrons;
   (d) second means for applying a voltage across said lasing medium to deposit power in said lasing medium effective to heat said free electrons to an energy level to produce additional free electrons and excite a fractional portion of both said rare gases to the metastable state, said fractional metastable population of both said rare gases being small whereby the metastable ionization rate is substantial, the metastable state of said rare gas metastables being sufficient whereby said rare gas metastables react with said halogen to result in a first excited composite comprising one of said rare gas metastables and said halogen, said first and second means providing an equilibrium ionization rate in said lasing medium; said halogen being present in an amount to provide said composite and an electron attachment rate at least about n times the said equilibrium ionization rate where n is the number of electron excitations which causes ionization of said first gas; and
   (e) means for coupling stimulated emission of radiation out of said cavity upon said excited composite decaying into said rare gas and halogen constituents.

4. The combination as defined in claim 3 wherein the power deposited in the lasing medium by said second means is not substantially less than the power deposited in the lasing medium by said first means.

5. The combination as defined in claim 4 wherein the power deposited in said lasing medium by said second means is greater than the power deposited in said lasing medium by said first means.

6. The combination as defined in claim 3 wherein said first means is an electron beam generator for generating a broad area electron beam and introducing said electron beam into said cavity.

7. The combination as defined in claim 6 wherein the power deposited in said lasing medium by said second means is greater than the power deposited in said lasing medium by said electron beam.

8. The combination as defined in claim 7 wherein the rate of production of free electrons providing said equilibrium ionization rate is not greater than one-half said attachment rate.

9. The combination as defined in claim 6 wherein said first rare gas is selected from the class consisting of argon, helium and neon and said first gas is excited to the metastable state and reacts with said halogen to form an intermediate second excited composite which then in turn reacts with said second gas to form additional first excited composite.

10. The combination as defined in claim 9 wherein said first gas is argon and comprises the majority of said lasing medium.

11. The combination as defined in claim 10 wherein said second gas is xenon and the amount of said xenon is substantially less than that of said first rare gas, and said halogen is nitrogen trifluoride and the amount of said nitrogen trifluoride is less than that of said xenon.

12. The combination as defined in claim 10 wherein the amount of said second rare gas is substantially less than that of said first rare gas and the amount of said halogen is less than that of said second rare gas.

13. The combination as defined in claim 12 where said halogen is selected from the class consisting of, fluorine, bromine and iodine.

14. The combination as defined in claim 4 wherein said lasing medium comprises about 93.7% argon, about 6.0% krypton and about 0.3% fluorine.

15. The combination as defined in claim 14 wherein said lasing medium is provided to said cavity at greater than atmospheric pressure.

16. The combination as defined in claim 2 wherein the said fractional metastable population is in the range of about $2 \times 10^{-5}$ to about $3 \times 10^{-4}$.

17. In the method of producing a substantially spatially uniform discharge substantially throughout a gaseous working medium in a working region, the steps comprising:
   (a) providing in a cavity a gaseous lasing medium comprising a first gaseous species capable of providing an excited state which has a finite probability of being ionized and a molecular second gaseous species having a capability for attaching electrons to form negative ions;
   (b) ionizing said working medium and generating free electrons therein; and
   (c) applying a voltage across said ionized working medium to heat said free electrons to a sufficient energy to excite a portion of said first species whereby said excited first species reacts with said second species to form an excited composite comprising said excited first species and said second species, the application of said voltage across said ionized working medium providing an equilibrium ionization rate in said lasing medium, said second species being provided in an amount to provide an electron attachment rate at least n times the said equilibrium ionization rate where n is the number of electron excitations which causes ionization of said first species.

18. In the method of producing a substantially spatially uniform discharge in a gaseous lasing medium to permit the production of stimulated emission of radiation in a cavity in laser apparatus, the steps comprising:
   (a) providing in a cavity a gaseous lasing medium comprising a rare gas and a halogen;
   (b) ionizing said lasing medium and generating free electrons therein; and
   (c) applying a voltage across said ionized lasing medium to further ionize said lasing medium and generate additional free electrons therein in an amount sufficient to excite a portion of said rare gas to the metastable state whereby said excited rare gas reacts with said halogen to form an excited composite comprising said excited rare gas and said halogen, the application of said voltage across said ionized working medium providing an equilibrium ionization rate in said lasing medium, said halogen being provided in an amount to provide an electron attachment rate at least about n times the said equilibrium ionization rate where n is the number of electron excitations which causes ionization of said rare gas.

19. In the method of light generation by stimulated emission of radiation, the steps comprising:
   (a) providing in an optically resonant cavity a gaseous lasing medium comprising a first rare gas, a second rare gas and a halogen;
   (b) ionizing said lasing medium and generating free electrons therein;
   (c) applying a voltage across said ionized lasing medium to further ionize said lasing medium and generate additional free electrons therein in an amount sufficient to excite a fractional portion of both of said rare gases to the metastable state, said fractional metastable population of both of rare gases being small and of such a magnitude that the metastable ionization rate is substantial, the metastable state of said rare gas metastables being sufficient whereby said metastables react with said halogen to form a first excited composite comprising one of said rare gas metastables and said halide, the application of said voltage across said ionized working medium providing an equilibrium ionization rate in said lasing medium, said halide being present in an amount to provide said composite and an electron attachment rate at least about n times the said equilibrium ionization rate where n is the number of electron excitations which causes ionization of said rare gases; and
   (d) coupling stimulated emission of radiation out of said cavity upon said excited composite decaying into said rare gas and halide constituents.

20. The method as defined in claim 19 wherein said voltage applied across said ionized working medium is controlled to deposit power in said lasing medium that is not substantially less than power deposited in said lasing medium by the ionization thereof.

21. The method as defined in claim 20 wherein said lasing medium is ionized by a broad area electron beam generated exterior of said cavity and introduced into said cavity through a wall thereof.

22. The method as defined in claim 21 wherein power deposited in said lasing medium by said electron beam is less than power deposited in said lasing medium by the application of said voltage across said ionized lasing medium.

23. The method as defined in claim 22 wherein said first rare gas is argon and said argon is excited to the metastable state and thereafter reacts with said halogen to form an intermediate second excited composite which then in turn reacts with said second rare gas to form additional first excited composite.

24. The method as defined in claim 23 wherein said argon comprises the majority of said lasing medium.

25. The method as defined in claim 24 wherein said second rare gas is krypton.

26. The method as defined in claim 24 wherein said halogen is selected from the class consisting of fluorine, bromine and iodine.

27. The method as defined in claim 24 wherein said second gas is xenon and the amount of said xenon is substantially less than said argon, and said halogen is nitrogen trifluoride and the amount thereof is less than that of said xenon.

28. The method as defined in claim 21 wherein said lasing medium comprises about 93.7% argon, about 6.0% krypton and about 0.3% fluorine.

29. The method as defined in claim 28 wherein said lasing medium is provided to said cavity at greater than atmospheric pressure and the fractional metastable population is maintained in the range of about $2 \times 10^{-5}$ to about $3 \times 10^{-4}$.

* * * * *